June 27, 1933.  C. M. GERE  1,915,488
PROCESS FOR MOLDING CHEESE
Filed March 6, 1931
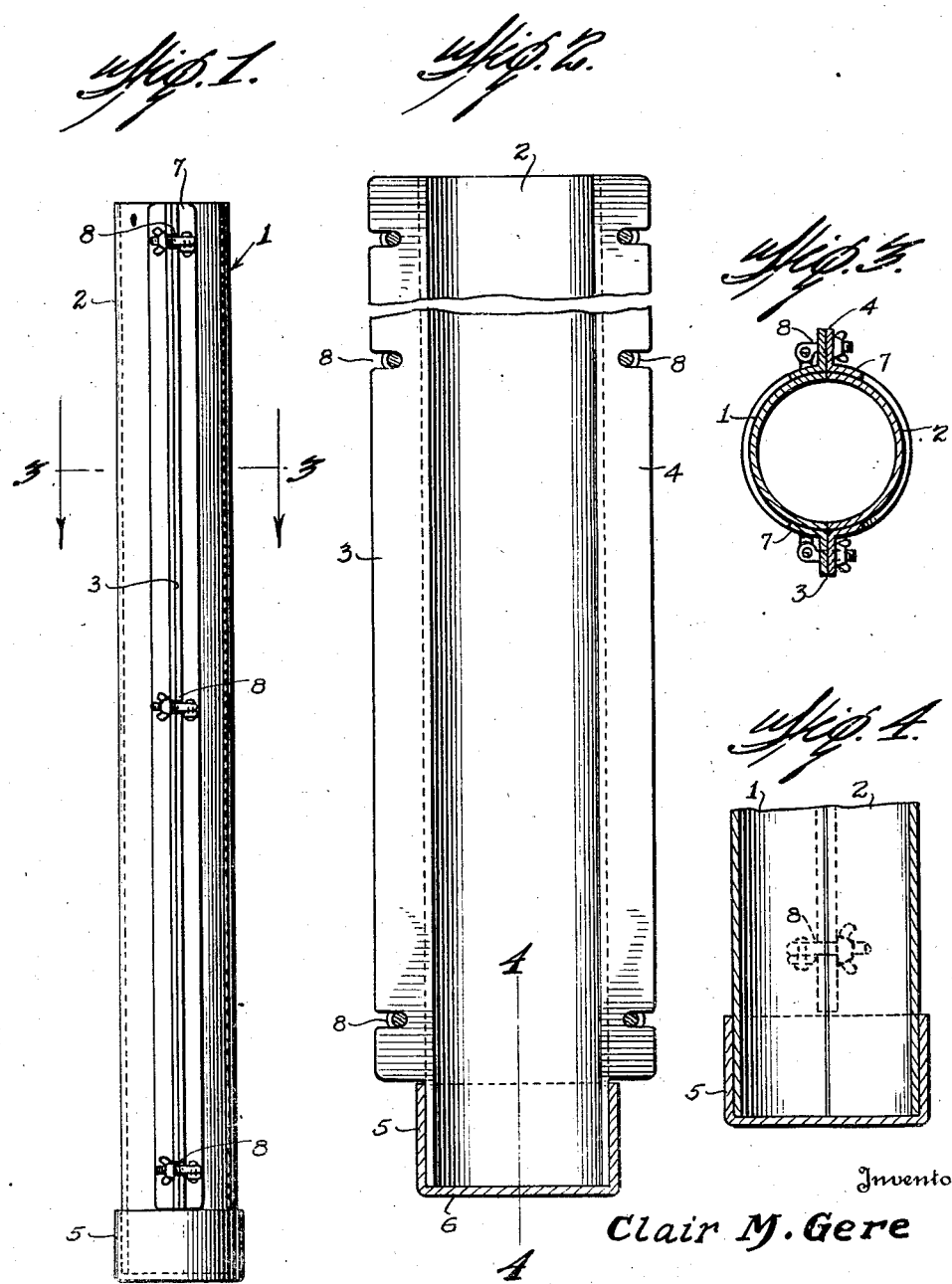
Inventor
Clair M. Gere
By Mason Fenwick Lawrence
Attorneys Patented June 27, 1933

1,915,488

UNITED STATES PATENT OFFICE

CLAIR M. GERE, OF BELFAST, NEW YORK, ASSIGNOR TO NATURAL CHEESE CORPORATION, OF DOVER, DELAWARE, A CORPORATION OF DELAWARE

PROCESS FOR MOLDING CHEESE

Application filed March 6, 1931. Serial No. 520,685.

This invention relates to the process of molding cheese for packaging in valve-vented containers of a type which permits the cheese to cure in the final package in an atmosphere inert to the development of living organisms therein by the evolution of carbon dioxide in the fermentive reaction of curing.

One of the objects of the invention is the provision of a process for molding cheese in a body shaped to have the same transverse dimensions as those of the container in which it is packed, so as to eliminate the presence of air spaces between the cheese and the walls of the container which might cause dilution of the carbon dioxide to a life-supporting degree.

Since cheese in the valve-vented package cures without material loss of moisture, no rind is formed and it is therefore undesirable, both from the standpoint of necessity as well as appearance's sake to have the packaged cheese wrapped in cheese cloth. Consequently, one of the objects of the invention is to provide a molding process in which the use of a cheese cloth bandage, or at least the permanent presence of such a bandage is avoided.

A further object of the invention is the provision of a mold of such construction that the cheese may be turned out freely in half pressed state and lacking the protection of the bandage without the risk of its becoming broken or disintegrated.

Still another object of the invention is the provision of a mold of uniform cross section, and long enough to contain a mass of cheese of sufficient length to be cut into a plurality of package units, so that, the weight of one unit having been ascertained, the other units can be cut exactly to the same weight.

Other objects of the invention will appear as the following description of a preferred and practical embodiment thereof proceeds.

The specification is illustrated by a drawing in which Fig. 1 is a side elevation of a mold the parts being in assembled relation;

Figure 2 is a section taken in the plane of separation of the mold halves;

Figure 3 is a cross section taken along the line 3—3 of Figure 1; and

Figure 4 is a longitudinal section of the lower end of the mold, taken along the line 4—4 of Figure 2.

Before adverting to a detailed description of the several figures, it may be stated that in carrying out the inventive principle relating to the curing of cheese in valve-vented containers, as described in my pending application Serial No. 499,600, containers are provided having preferably a uniform cross section in which the molded cheese is placed, it being highly desirable that the cheese fit the container snugly so as to occupy substantially all the space and leave no room for the inclusion of air which may dilute the carbon dioxide evolved in the curing reaction to a degree at which it will fail to be a sterilizing agent rendering the cheese proof against deterioration through bacterial growth.

The mold illustrated and described in the present invention is designed for the specific purpose of molding the cheese to fit such valve-vented containers.

In the process of molding cheese as at present practiced the problem of snugly fitting the cheese to the container is not present since the curing is done prior to the final packaging. Consequently, for convenience in taking the cheese from the mold, the ordinary mold has in general been of tapered form into which the cheese is pressed and from which it is withdrawn through the larger end, the same end into which is was introduced. Since the cheese as at present molded is generally of quite large bulk and subjected to considerable stress in getting it out of the mold, it has been found necessary to protect it from breaking by surrounding it with a bandage of cheese cloth or the like, and molding it with this bandage. In the initial stage of pressing the curd into a homogeneous mass, the cheese cloth becomes imbedded in the surface of the cheese mass with such tenacity that it is impractical to remove the cheese cloth after the pressing operation is completed. Furthermore, in the subsequent process of curing cheese, the bandage is of a positive advantage since it prevents fissures forming in the drying cheese and also assists in forming the rind by which the cheese is protected in subsequent handling.

The use of cheese cloth in connection with cheese cured in valve-vented containers is without advantage in the finished product and detracts from its appearance. Consequently, the process of molding cheese for the valve-vented containers must be so ordered as to eliminate the use of the bandage. If cloth is used at all, the process must be so modified that the cloth can be removed from the cheese before it is packed in the final containers, a procedure which has not been practical, as has been explained above, with known cheese molding processes.

Referring now in detail to the drawing:

The numeral 1 represents in general a cylindrical mold of uniform diameter throughout.

Figure 2 shows that the mold is formed of flanged halves 2, the flanges 3 and 4 extending longitudinally throughout the greater part of the length of the mold, but terminates a short distance from the lower end of the mold, leaving said lower end when the two halves are together, uniformly cylindrical, as is shown at 5 in Figure 2. A cup shaped cover 6 slips over the cylindrical end of the mold and assists in holding the flanged halves against separation at the lower end. The longitudinal flanges are held together by suitable means as the tumble bolt 7 which may be pivotally secured to one half and having thumb nuts adapted to bear against the flanges of the other half, the shank of the bolts passing through recesses 8 formed in said flanges.

In using the mold, the cheese curd after having been reduced to a somewhat granular form by cutting in a curd mill or hand stirring, and having been seasoned in the usual manner, is introduced into the top of the mold until the latter is full, being pressed in a suitable press, not shown, through the medium of a wooden follower, not shown, which slidably fits the mold.

After having been subjected to a preliminary pressing for about thirty minutes, or until such time as the free moisture is expelled, escaping between the flanges, and the curd is cemented together into a solid mass, the tumble bolts are loosened, the cup 6 removed and the upper half of the mold taken off; the lower half bearing a cylindrical body of cheese is then inverted on a piece of factory cloth, or the like.

It will be understood that during this preliminary pressing no bandage has been used and that in the act of turning the cheese out of the mold it has been subjected to no strain due to the novel construction of the mold, and in consequence, no bandage has been needed.

The texture of the surface of the cheese is, however, rough being not only of poor appearance but having superficial interstices through which residual air may be retained in the final container. To provide a smooth surface for the cheese it is now wrapped in the factory cloth upon which it was deposited and is now reintroduced into the mold, the mold re-assembled, and the cheese subjected to a further pressing which may continue for 5 or 6 hours. The mold is then removed from the press, taken apart, and the cheese removed. Since the factory cloth was not on the cheese in its initial pressing it has not become irremovably embedded in the surface of the cheese as would have been the case had it been wrapped about the cheese during the entire pressing period, and is therefore, readily removed. The molded cheese is then cut transversely into sections of suitable size to fit within the containers. Since the mass of cheese is of uniform diameter and has been subjected to uniform pressure throughout, it is obvious that equal lengths of the cheese mass will have exactly the same weight. Consequently, the weight of the individual package portions may be controlled by experimentally determining how long a piece should be cut off to equal the desired weight and then cutting all subsequent pieces to the same exact length.

It is to be understood that the specific construction of mold shown in the drawing and described in the specification is merely by way of example and that other constructions are within the spirit of the invention by which the inventive process may be successfully carried out. The specific details are therefore not to be considered limitative upon the scope of the invention as claimed.

What I claim as my invention is:

1. Process for molding cheese to be packed, uncured in valve-vented containers comprising pressing the cheese curd in a mold of uniform cross sections, without bandage, for an initial period sufficient to weld the curd particles into a solid mass and expel moisture, removing the shaped mass from the mold and wrapping it in "factory cloth", or the like, pressing the wrapped mass in the mold to the final state and degree of solidity, and removing the "factory cloth".

2. Process for molding cheese to be packed in containers or other packages requiring exact or net weight, comprising producing homogenuity in the density of the cheese by pressing the cheese curd in a mold of uniform cross section, and of a length to form a block of cheese long enough to be cut in several package units, without bandage, for an initial period sufficient to weld the curd particles into a solid mass and expel moisture, removing the shaped mass from the mold and wrapping it in "factory cloth", or the like, pressing the wrapped mass in the mold to the final state and degree of solidity, removing the "factory cloth", and cutting the block of cheese into the desired lengths, which lengths are directly proportional to the weights of the cut portions.

In testimony whereof I affix my signature.

CLAIR M. GERE.